United States Patent
Venkata et al.

(10) Patent No.: US 9,569,176 B2
(45) Date of Patent: Feb. 14, 2017

(54) DERIVING ENTROPY FROM MULTIPLE SOURCES HAVING DIFFERENT TRUST LEVELS

(71) Applicant: Seagate Technology LLC, Cupertino, CA (US)

(72) Inventors: Sumanth Jannyavula Venkata, Shakopee, MN (US); Manuel A. Offenberg, San Francisco, CA (US); William Erik Anderson, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 286 days.

(21) Appl. No.: 14/528,683

(22) Filed: Oct. 30, 2014

(65) Prior Publication Data

US 2016/0124716 A1     May 5, 2016

(51) Int. Cl.
    *G06F 7/58*     (2006.01)

(52) U.S. Cl.
    CPC ............... *G06F 7/588* (2013.01); *G06F 7/58* (2013.01)

(58) Field of Classification Search
    CPC .................................. G06F 7/58; G06F 7/588
    See application file for complete search history.

(56) References Cited

U.S. PATENT DOCUMENTS

| | | | |
|---|---|---|---|
| 4,291,386 A | 9/1981 | Bass | |
| 6,408,317 B1 | 6/2002 | Djakovic | |
| 6,628,786 B1 | 9/2003 | Dole | |
| 6,714,955 B2 | 3/2004 | LeQuere | |
| 6,763,364 B1 | 7/2004 | Wilber | |
| 7,139,397 B2 | 11/2006 | Messina et al. | |
| 7,587,047 B2 | 9/2009 | Crandall et al. | |
| 8,019,802 B2 | 9/2011 | Rose et al. | |
| 8,144,872 B2 | 3/2012 | Hu et al. | |
| 8,209,540 B2 | 6/2012 | Brouwer et al. | |
| 8,312,071 B2 | 11/2012 | Kailas et al. | |
| 2003/0065692 A1 | 4/2003 | Furukawa et al. | |
| 2005/0033705 A1* | 2/2005 | Walmsley | B41J 2/14 705/67 |
| 2005/0193045 A1 | 9/2005 | Yamamoto et al. | |
| 2007/0150531 A1 | 6/2007 | Jeon | |

(Continued)

OTHER PUBLICATIONS

"Secure Hash Standard (SHS)," Federal Information Processing Standards Publication, Mar. 2012, pp. 1-37, FIPS PUB 180-4, U.S. Department of Commerce: National Institute of Standards and Technology, US.

(Continued)

*Primary Examiner* — Chuong D Ngo
(74) *Attorney, Agent, or Firm* — Hall Estill Attorneys at Law

(57) ABSTRACT

Apparatus and method for generating random numbers. In accordance with some embodiments, a first multi-bit string of entropy values is derived from a first entropy source having a first trust level and a different, second multi-bit string of entropy values is derived from a second entropy source having a different, second trust level. The first and second multi-bit strings of entropy values are combined in relation to the associated first and second trust levels to generate a multi-bit random number. The multi-bit random number is used as an input to a cryptographic function.

20 Claims, 6 Drawing Sheets

(56) References Cited

U.S. PATENT DOCUMENTS

2013/0136255 A1    5/2013   Brown
2014/0059555 A1    2/2014   Bacher et al.
2015/0199178 A1*   7/2015   Shi .................... G06N 99/002
                                                             708/254

OTHER PUBLICATIONS

"Digital Signature Standard (DSS)," Federal Information Processing Standards Publication, Jul. 2013, pp. 1-130, FIPS PUB 186-4, U.S. Department of Commerce: National Institute of Standards and Technology, US.

Barker and Kelsey, "Recommendation for Random No. Generation Using Deterministic Random Bit Generators," NIST Special Publication 800-90A, Jan. 2012, pp. 1-136, U.S. Department of Commerce: National Institute of Standards and Technology, US.

Barker and Kelsey, "Recommendation for the Entropy Sources Used for Random Bit Generation," NIST Draft Special Publication 800-90B, Aug. 2012, pp. 1-78, U.S. Department of Commerce: National Institute of Standards and Technology, US.

* cited by examiner

DERIVING ENTROPY FROM MULTIPLE SOURCES HAVING DIFFERENT TRUST LEVELS

SUMMARY

Various embodiments of the present disclosure are generally directed to the generation of random numbers from multiple entropy sources having different trust levels.

In some embodiments, a first multi-bit string of entropy values is derived from a first entropy source having a first trust level and a different, second multi-bit string of entropy values is derived from a second entropy source having a different, second trust level. The first and second multi-bit strings of entropy values are combined in relation to the associated first and second trust levels to generate a multi-bit random number. The multi-bit random number is thereafter used as an input to a cryptographic function.

In other embodiments, an apparatus includes a first entropy source which generates a first sequence of entropy values, a second entropy source which generates a second sequence of entropy values, and a trust level evaluation circuit which establishes a first trust level for the first entropy source responsive to the first sequence of entropy values and which establishes a second trust level for the second entropy source responsive to the second sequence of entropy values. A random number generator circuit generates a random number responsive to the first and second sequences of entropy values and the associated first and second trust levels. A cryptographic function block applies a selected cryptographic function to a set of input data responsive to the random number from the random number generator circuit.

In further embodiments, a data storage device includes a non-volatile memory and a controller adapted to direct data transfers between the non-volatile memory and a host device. The controller generates a random number for use in a cryptographic function applied to a selected set of data stored in the non-volatile memory by establishing a first trust level for a first entropy source and a second trust level for a second entropy source, combining entropy values from the respective first and second entropy sources responsive to the first and second trust levels to generate an output value, and using the output value to generate the random number.

These and other features which characterize various embodiments of the present disclosure can be understood in view of the following detailed discussion and the accompanying drawings.

DETAILED DESCRIPTION

Figure 1:
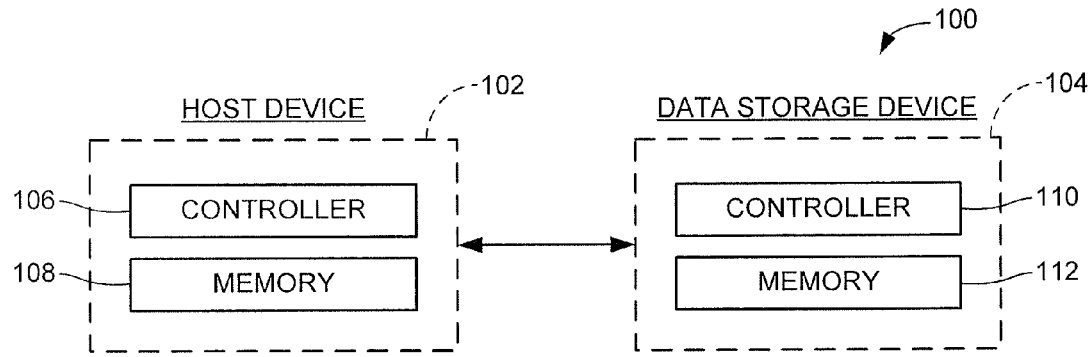
FIG. 1 is a functional block representation of a data processing system which operates in accordance with various embodiments of the present disclosure.

Data security schemes are used to reduce or eliminate access to data by unauthorized users of digital data storage systems. Data security schemes can employ a variety of cryptographic security techniques, such as data encryption and other data security protocols.

Data encryption generally involves the transformation of an input data sequence (plaintext) to an encrypted output data sequence (ciphertext) using a selected encryption algorithm (cipher). The cipher may utilize one or more pieces of auxiliary data (keys) to effect the transformation. In this context, plaintext can include data that have been previously encrypted by an upstream encryption process.

Data security protocols more generally deal with maintaining the security of data within a system, such as by establishing symmetric keys, carrying out secret sharing transactions, establishing and verifying connections, authenticating data, generating digital signatures and keyed message digests, etc.

Data encryption schemes and other security protocols are often designed to utilize random numbers. In practice, the generation of truly random numbers is often technologically difficult to implement. A variety of solutions have been proposed in the art to enable memory based systems to generate random (or pseudo) random numbers for cryptographic security and other purposes. While operable, these solutions are often either lacking in the ability to generate true random numbers or require excessive computational resources.

Accordingly, various embodiments of the present disclosure are generally directed to an apparatus and method for generating random numbers in the form of random bits or random bit sequences. As explained below, in some embodiments multiple entropy sources are provided in a data processing system. Each of the entropy sources has an associated trust level. The outputs from the respective entropy sources are combined in relation to the associated trust levels to generate random numbers. The generated random numbers are available for use in a cryptographic process of a data security system.

In some embodiments, a trust level evaluation circuit assigns entropy levels from the various sources and identifies those having acceptable levels of entropy as qualified sources. The outputs from the qualified sources are combined to provide a composite entropy value. The outputs can be combined in a variety of ways.

In some cases, all sources exhibiting at least a baseline acceptable level of trust are identified as qualified sources and their outputs are used in equal amounts. In other cases, weighting values are used so that outputs from qualified sources having relatively higher trust levels receive greater weight and make up a larger portion of the combined entropy value. Outputs from qualified sources having relatively lower trust levels receive lower weight and make up a smaller portion of the combined entropy value.

Combinatorial functions can be applied to the outputs from different randomized extractors. The combined entropy outputs can be used to generate input seed values for a deterministic random bit generator (DRBG).

Cryptographic trust boundaries can be defined and used as part of the trust level evaluation process. Whether an entropy source resides within a boundary or crosses one or more boundaries can be factored into the trust level analysis. The certification and/or hardening of entropy sources can also be used to evaluate trust levels. Another factor is the extent to which a particular entropy source is open to be compromised. For example, a firmware based entropy source might be more open to attack or corruption, and hence relatively less trustworthy, than a hardware based entropy source.

These and other features and advantages of various embodiments can be understood beginning with a review of FIG. 1 which shows a data processing system 100. The data processing system 100 includes a host device 102 operably coupled to a data storage device 104.

The host device 102 and the data storage device 104 can each take a variety of forms. Without limitation, the host device 102 may take the form of a personal computer, workstation, server, laptop, portable handheld device, smart phone, tablet, gaming console, etc. The data storage device 104 may be a hard disc drive (HDD), solid-state drive (SSD), thumb drive, optical drive, an integrated memory module, a multi-device storage enclosure, etc. The data storage device 104 may be incorporated into the host device as an internal component or may be an external component accessible via a communication pathway with the host device 102 including a cabling connection, a wireless connection, a network connection, etc.

For purposes of the present discussion, it will be contemplated that the host device 102 is a computer and the data storage device 104 provides a main memory store for user data generated by the host device. The host device 102 includes a host controller 106 and local host memory 108. In this example context, the host controller 106 is a programmable processor that executes an operating system (OS) resident in the memory 108, as well as one or more applications accessed through a user interface (not separately shown).

The data storage device 104 includes a storage device controller 110 and storage memory 112. The storage device controller 110 provides top level control of the storage device and operates to schedule and direct execution of data access commands from the host device 102 to transfer user data between the storage memory 112 and the local host memory 108. The storage device controller 110 can be realized as a system on chip (SOC) integrated circuit device of the storage device 104 that executes firmware (FW) programming stored in the memory 112.

It is contemplated that the data processing system 100 incorporates one or more data security schemes to protect the system from unwanted access by unauthorized third parties. The data security scheme(s) may take a variety of forms, including modules that control access to the host and to the storage device. A variety of cryptographic functions, such as but not limited to encryption systems, may be used to protect user data stored in the data storage memory 112.

Figure 2:
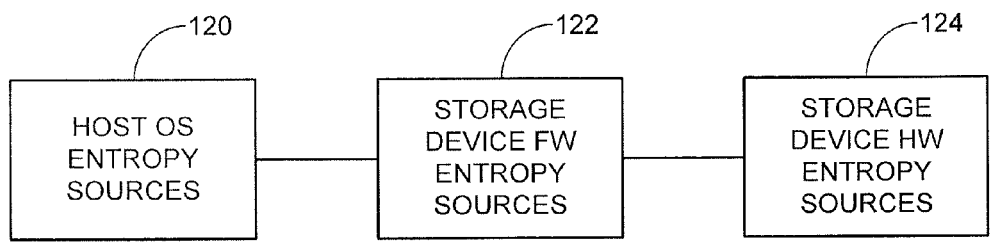
FIG. 2 illustrates different types of entropy sources that may exist in the host device and data storage device of FIG. 1.

To this end, the data processing system 100 has the capability of generating random numbers (bits) as inputs to the data security scheme(s) employed by the system. As explained below, such random numbers are extracted using a variety of entropy sources located throughout the system. FIG. 2 provides a graphical depiction of some exemplary entropy sources that may exist and be available for use in the system 100 of FIG. 1. It will be appreciated that other forms and types of entropy sources may be available so FIG. 2 is merely exemplary and is not limiting.

FIG. 2 depicts host operating system (OS) level entropy sources 120, storage device firmware (FW) entropy sources 122, and storage device hardware (HW) entropy sources 124. Each of these can take a variety of forms depending on the requirements of a given application, and examples of each of these types of entropy sources will be given below.

The term "entropy" generally relates to the amount of information in a set of data. In one formulation, entropy is the minimum number of bits required to represent the data of interest. The entropy of a true random number string is the number of bits required to represent all possible values for the length of the string. Thus, ideally, the entropy of a true random number sequence is equal to its length; every bit in the sequence would be completely random and independent of every other bit in the sequence.

Maximizing the amount of entropy in a random number used in a cryptographic function tends to maximize the effectiveness of the function against attack. The greater the amount of entropy contained in a cryptographic key used to encrypt data using a selected encryption algorithm (cipher), the greater the difficulty in guessing the key or determining the key using brute force methods.

The various entropy sources represented in FIG. 2 will tend to have widely different levels of entropy in their respective outputs. Indeed, some of the sources can exhibit extremely low levels of entropy. Extraction techniques can be applied to extract random sequences with high levels of entropy from input values having relatively lower levels of entropy.

The term "trust level" relates to the extent to which entropy in the output from an entropy source can be trusted. Trust level is based on a variety of factors. A storage device might treat the entropy sources within its control as having a relatively high level of trust, since the entropy sources reside within the confines of its own system space (so called "cryptographic trust boundary" or just "boundary"). A source outside this boundary, such as a host operating system (OS) entropy source, might be treated as being less trustworthy. Additional cryptographic trust boundaries may be formed within the storage device. For example, the storage device may view internal hardware based sources as more trustworthy as internal firmware based sources.

It can be seen that entropy and trust levels are different, albeit related, concepts. A source that normally generates relatively high levels of entropy could be found to have a relatively low trust level, and a source that normally generates relatively low levels of entropy could be found to have a relatively high trust level. A number of statistical tests, certification protocols and hardening techniques are known in the art to evaluate both entropy and trust levels from a given source.

Referring again to FIG. 2, the host OS entropy sources 120 are located within the host device 102 and can include programs, applications, OS subroutines, etc. that generate entropy values. One well known host OS level entropy source is the /dev/random function call (file) available in many UNIX® based operating systems. Execution of this function call returns a string of random numbers based on an accumulated pool of entropy values.

Some host OS level entropy sources can have a hardware component, such as specially configured circuits that generate statistically random noise signals based on various effects such as thermal noise, the photoelectric effect or other quantum phenomena, timing of certain events, etc. For example, a counter and timing system can be used to aggregate entropy values based on system events (e.g., keystrokes, system calls, etc.).

The storage device FW level entropy sources 122 in FIG. 2 are located in the data storage device 104 and relate to entropy values generated by the storage device firmware. Examples include routines similar to the host OS level entropy sources such as timing circuits that aggregate entropy values based on system events, etc.

The storage device HW entropy sources 124 in FIG. 2 are also located in the data storage device and relate to entropy values obtained from the storage device hardware. Examples include ring oscillators and other specially configured random bit generator circuits designed to output entropy values. Based on the construction of the data storage device, accumulated parameters obtained during normal storage device operation can also be used to generate low entropy values. For example, back electromotive force (BEMF) measurements of a voice coil motor (VCM) or spindle motor can be used to generate entropy values. Entropy values can also be generated by accumulating the number of programming pulses required to program various solid-state memory cells in the memory module 112, etc. It will be appreciated that the foregoing examples of entropy sources are merely exemplary as any number of different types of entropy sources can be used in accordance with the present discussion.

The different entropy sources represented in FIG. 2 tend to have different trust levels. Generally, the host OS entropy sources 120 may be viewed as having the lowest trust levels, the storage device FW entropy sources 122 may have higher trust levels, and the storage device HW entropy sources 124 may have the highest trust levels. Other applications may exhibit different characteristics so the foregoing observations are merely for discussion purposes and are not limiting. The locations of cryptographic trust boundaries, the application of source certifications and/or hardening efforts, and the physical constructions of specific entropy sources can also affect the respective trust levels of the sources.

Figure 3:
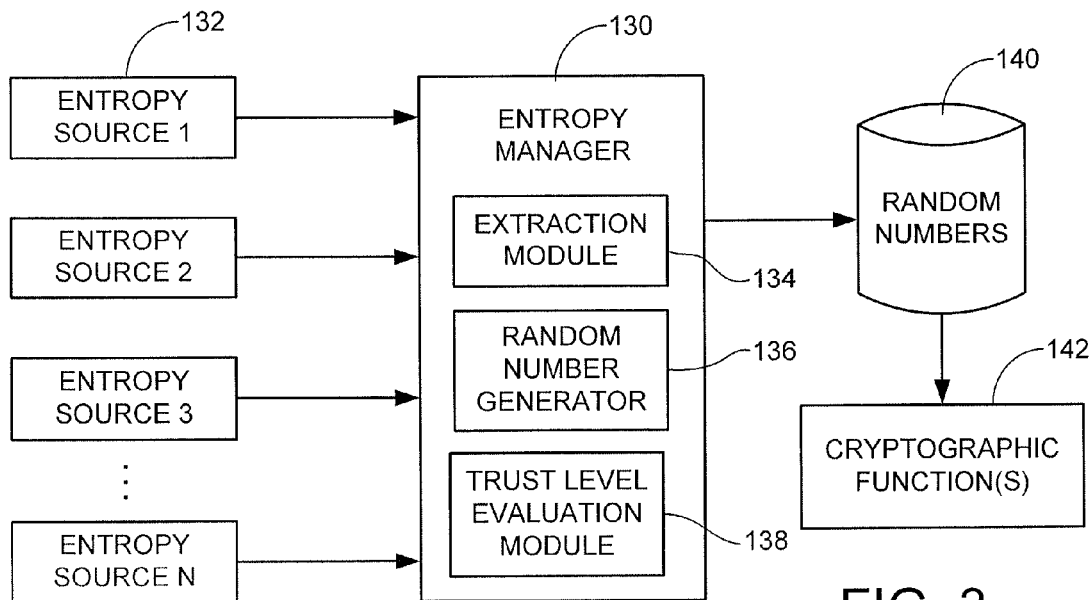
FIG. 3 is a functional block representation of an entropy manager operable in accordance with various embodiments to generate random numbers for use by the data processing system of FIG. 1.

FIG. 3 shows an entropy manager 130 that uses entropy sources such as represented in FIG. 2 to generate random numbers. The entropy manager 130 is disposed within the data processing system 100 (FIG. 1), and may be located in the host device 102 or the data storage device 104. In some embodiments, a separate entropy manager 130 is located within each of these devices 102, 104 to locally generate random numbers for use by that device.

The entropy manager 130 receives entropy values from a number of entropy sources 132, identified as entropy sources 1 through N. The entropy sources 132 are distributed among various operational devices such as represented in FIG. 2. If the entropy manager 130 is located within the data storage device 104, some of the entropy sources will be local (e.g., also located in the data storage device) and others will be remote (e.g., provided at the host level or from other devices such as other data storage devices coupled to the host).

The entropy manager 130 includes a number of modules including an extraction module 134, a random number generator 136 and a trust level evaluation module 138. These various elements can be realized in hardware, firmware and/or software. Output random numbers are stored in a memory 140 pending use by one or more cryptographic functions 142.

The extraction module 134 takes the form of an entropy extractor adapted to extract entropy from one or more entropy sources. The output bit sequences from the extractor can be supplied as an input to the random number generator 136, which may take the form of a deterministic random bit generator (DRBG).

Figure 4:
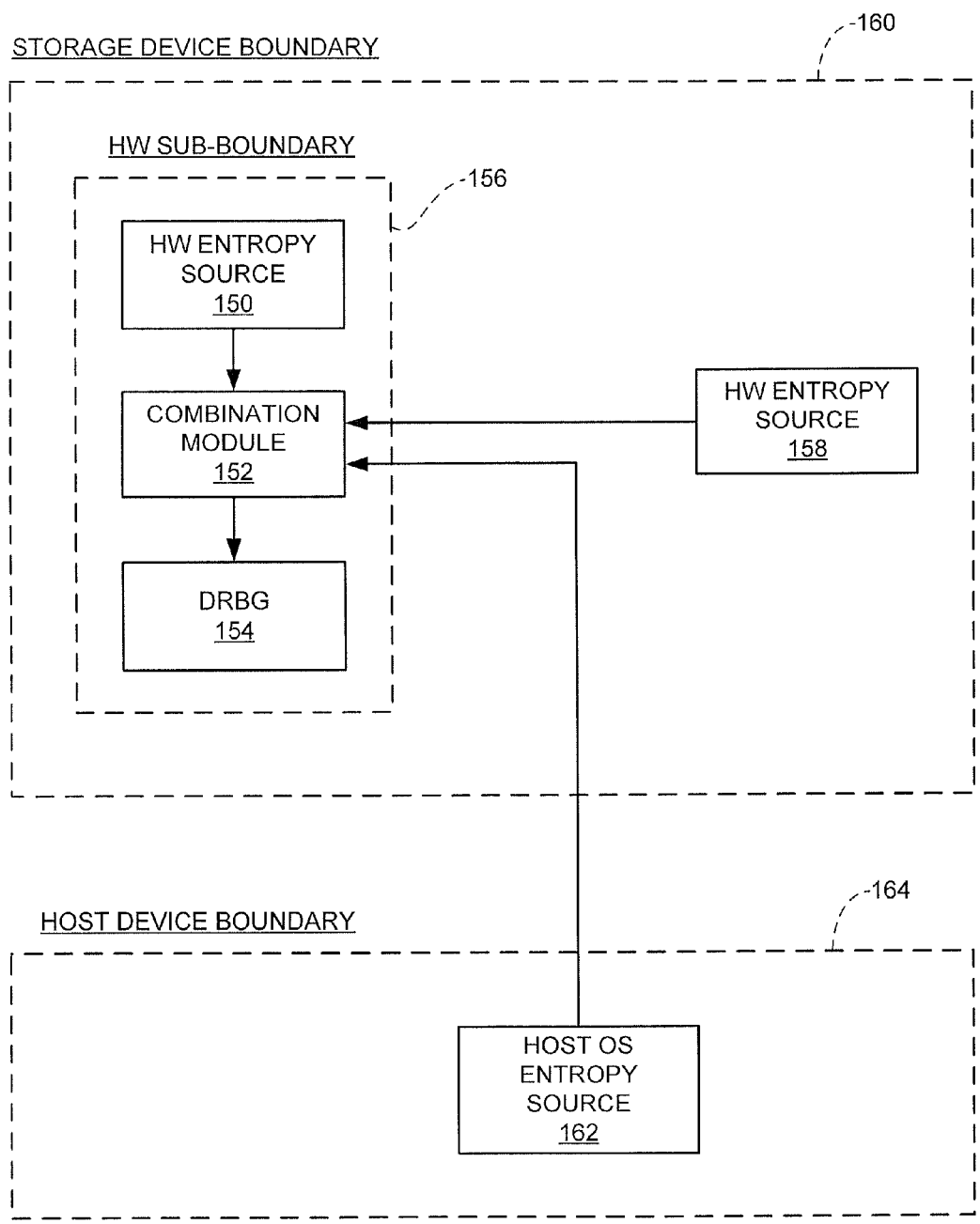
FIG. 4 shows operation of the entropy manager of FIG. 3 using different cryptographic trust boundaries.

FIG. 4 shows operation of aspects of FIG. 3 in some embodiments. A hardware (HW) entropy source 150, a combination module 152 and a DRBG 154 are located within a HW sub-boundary 156 within the storage device 100. The HW entropy source may take the form of a ring oscillator network or other physically manifested hardware features adapted to generate entropy. The combination module processes the output of the HW entropy source 150 as required, and supplies the resulting sequence as an input to the DRBG 154 which, in turn, generates a random sequence.

The sub-boundary 156 that surrounds the HW entropy source 150, the combination module 152 and the DRBG 154 can be defined in a number of ways. The elements 150, 152, 154 may reside within the same system on chip (SOC) integrated circuit, or within certain proximity on an internal circuit board, or are otherwise configured in such a way that results in the assignment of a relatively high level of trust to the associated circuitry. It may be relatively difficult, for example, for an attacker to modify or influence the elements within the sub-boundary 156. Accordingly, all operative elements associated with the generation of random numbers within the sub-boundary may be assigned a high trust level.

A firmware (FW) entropy source is represented by block 158 to provide entropy values based on firmware or firmware controlled functions. The FW entropy source 158 is disposed within the storage device, and hence is within a second, larger storage device boundary 160. Still, the FW entropy source 160 is outside of the sub-boundary 156 so that the entropy output from the source 160 must "cross" the sub-boundary 156 to reach the combination module 152. Accordingly, because the entropy crosses a boundary, the HW entropy source 158 may be assigned a relatively lower trust level.

A host OS entropy source is denoted at 162. This entropy source is outside of the storage device (e.g., outside boundary 160) and is instead within a separate host device boundary 164. It can be seen that providing the output entropy from source 162 to the combination module 152 requires the crossing of three (3) different boundaries. In some cases, this might result in the entropy source 162 being assigned a lowest level of trust. However, if the communications between the entropy source 162 and the combination module 152 are over a secure channel, or other steps are taken such as certification of the source or hardening of the source, then the entropy source 162 may be assigned a higher level of trust, including in some cases a highest level of trust (including potentially as high or higher than the trust assigned to HW entropy source 150).

So it can be seen that, while not dispositive, generally cryptographic boundaries can be used as part of the trust evaluation process, with more crossings of boundaries tending to lower overall trust and the crossing of fewer (or no) boundaries resulting tending toward higher trust. Other factors can mitigate this evaluation, as in the example of a certified source that crosses multiple boundaries but nevertheless is assigned a high trust level due to the security protocols in place to ensure that the output is trustworthy.

Figure 5:
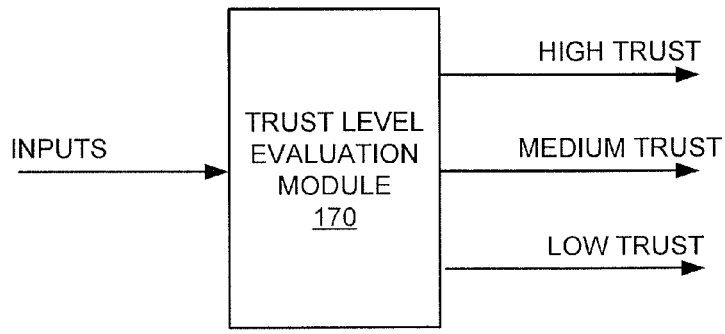
FIG. 5 illustrates operation of the trust level evaluation circuitry of FIG. 3.

FIG. 5 generally depicts the operation of a trust level evaluation module 170 in accordance with some embodiments. A number of different parametric, heuristic and state inputs can be supplied to the module 170 to enable the module to assign various levels of trust to various entropy sources. The module 170 provides three (3) levels of trust: low, medium and high. Other numbers of levels can be used, including fewer than three and more than three levels.

While not limiting, cryptographic trust levels can be assigned by the module 170 in a variety of ways. High trust levels may be provided for sources that are within cryptographic sub-boundaries (e.g., no boundaries are crossed), sources that are difficult to compromise, and sources that are hardened against side-channel attacks.

Medium trust levels may be provided for sources that are within a main boundary (such as within a storage device housing boundary) but are more open to being compromised, albeit with an attacker that may require specialized information or access in order to do so. Low trust levels may be for external sources that cross one or more boundaries (such as host based sources) that are the most open to being comprised by an attack.

As will be appreciated, if an attacker could insert a non-random sequence or a sequence with low or specially configured entropy (e.g., all logical "0s," etc.), this could potentially affect the overall randomness of the finally generated random numbers. The various embodiments disclosed herein take trust levels into account when combining the entropy from multiple sources to reduce these effects.

The entropy from multiple sources can be combined in a variety of ways. In some cases, the respective outputs from different entropy sources can be supplied (either directly or indirectly through an intervening extractor) to a combinatorial function such as an exclusive-or (XOR) operation, a hash function, etc., with the resulting output supplied as an input to a DRBG.

Figure 6:
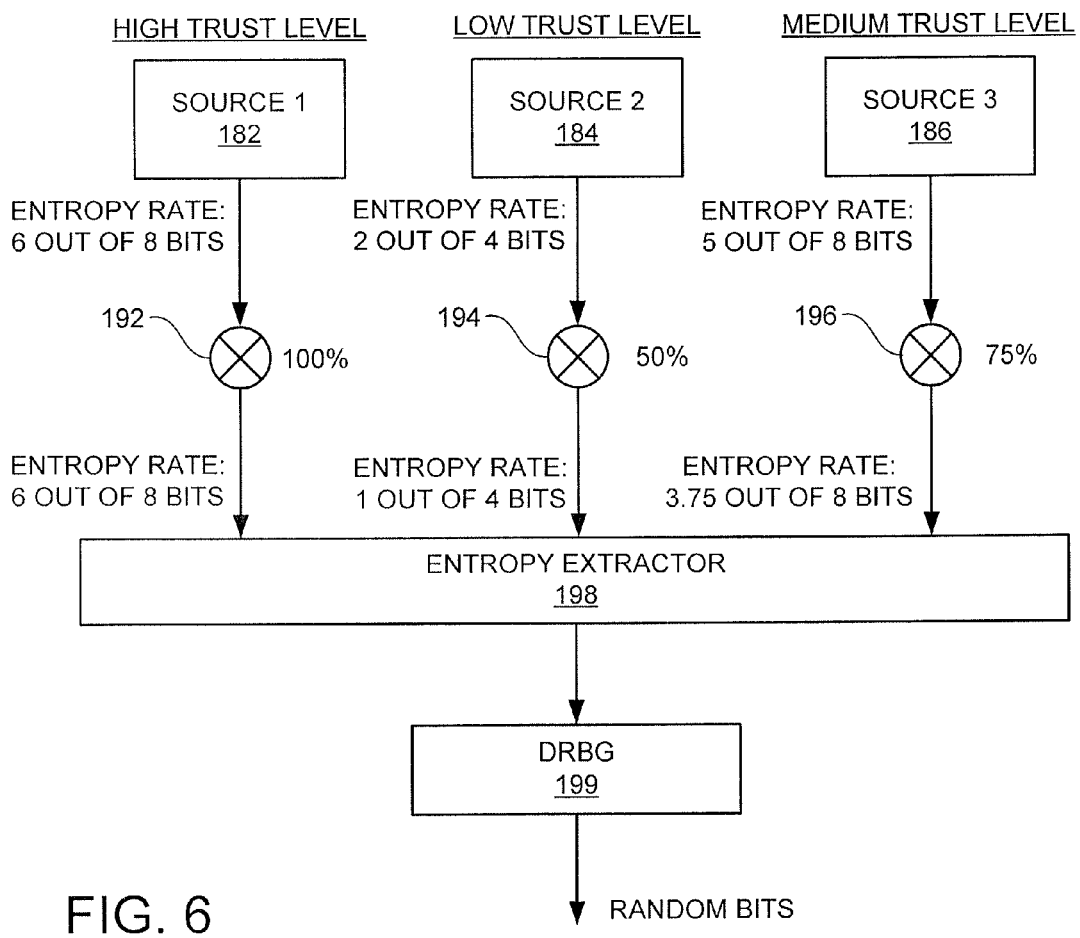
FIG. 6 illustrates the generation of random numbers from multiple entropy sources having different trust levels in accordance with some embodiments.

In some embodiments, weighting factors are used in relation to the respective trust levels. FIG. 6 is a schematic representation of a control circuit 180 that generates random numbers from first, second and third entropy sources 182, 184 and 186, identified respectively as sources 1 through 3. The sources 182, 184 and 186 are provided with respective high, low and medium trust levels.

The sources provide different respective entropy rates that are substantially independent of the trust levels. Source 1 provides an entropy rate of 6 out of 8 bits. Source 2 provides an entropy rate of 2 out of 4 bits. Source 3 provides an entropy rate of 5 out of eight bits. These are merely exemplary as any associated entropy rates could be provided in conjunction with any associated trust levels.

A series of weighting circuits 192, 194 and 196 are coupled to the outputs of the respective sources. The weighting circuit 192 applies a weighting value of 100% to the high trust level source 1, the weighting circuit 194 applies a derated weighting value of 50% to the low trust level source 2, and the weighting circuit 196 applies a derated weighting value of 75% to the medium trust level source 3. In this way, an entropy extractor receives 6 out 8 bits of entropy from source 1, 1 out of 4 bits of entropy from source 2, and 3.75 out of 8 bits of entropy from source 3. The weighting circuits 192, 194, 196 thus operate to throttle or restrict the respective combinations of the sources.

An entropy extractor 198 receives the respective outputs of the weighting circuits 192, 194 and 196 to generate a multi-bit input to a DRBG 199, which in turn supplies output random numbers in the form of a random bit sequence. The random bit sequence can thereafter be used as described above in FIG. 3 as an input to a cryptographic function, such as a function used to cryptographically protect data storage on one or more of the data storage devices in the system.

Figure 7:
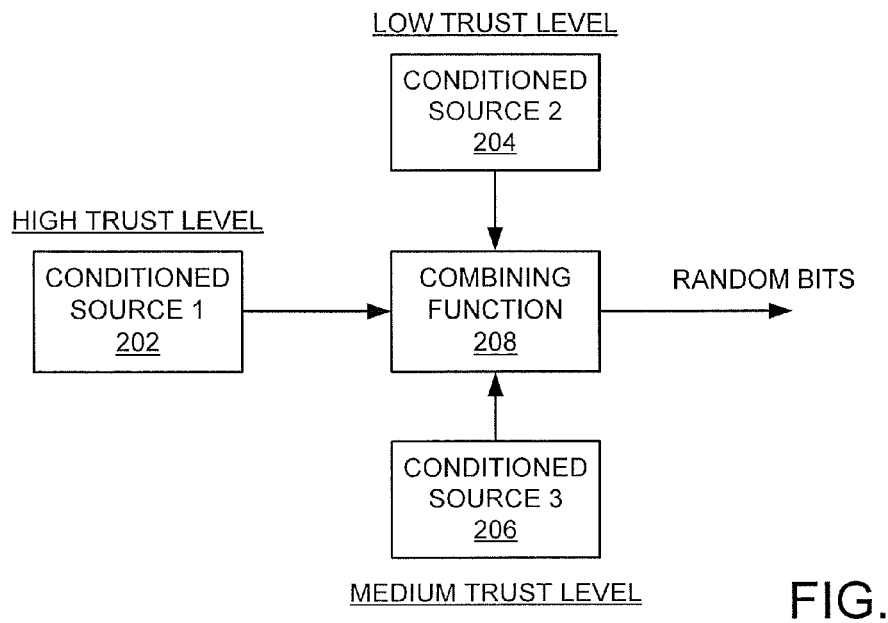
FIG. 7 illustrates the generation of random numbers from multiple entropy sources having different trust levels in accordance with other embodiments.

FIG. 7 illustrates an alternative arrangement for the generation of random numbers. FIG. 7 provides first, second and third conditioned entropy sources 202, 204 and 206 (sources 1-3), each having respective trust levels as shown. The outputs of the respective sources are supplied to a combining function block 208 to output random numbers as a sequence of random bits. As before, the combining function can take any number of forms including combinatorial logic, encryption blocks, hash functions, etc. While not limiting, the input from the high trust level source 202 may be seeded or tweaked by the outputs from the medium and low trust level sources 204, 206. Other combinations are envisioned.

The sources in FIG. 7 are characterized as conditioned sources so that some amount of pre-processing may be supplied to these sources prior to application to the combining function block 208. The pre-processing may use an entropy extractor, a mixer, a DRBG or other mechanism to condition the entropy output.

Figure 8:
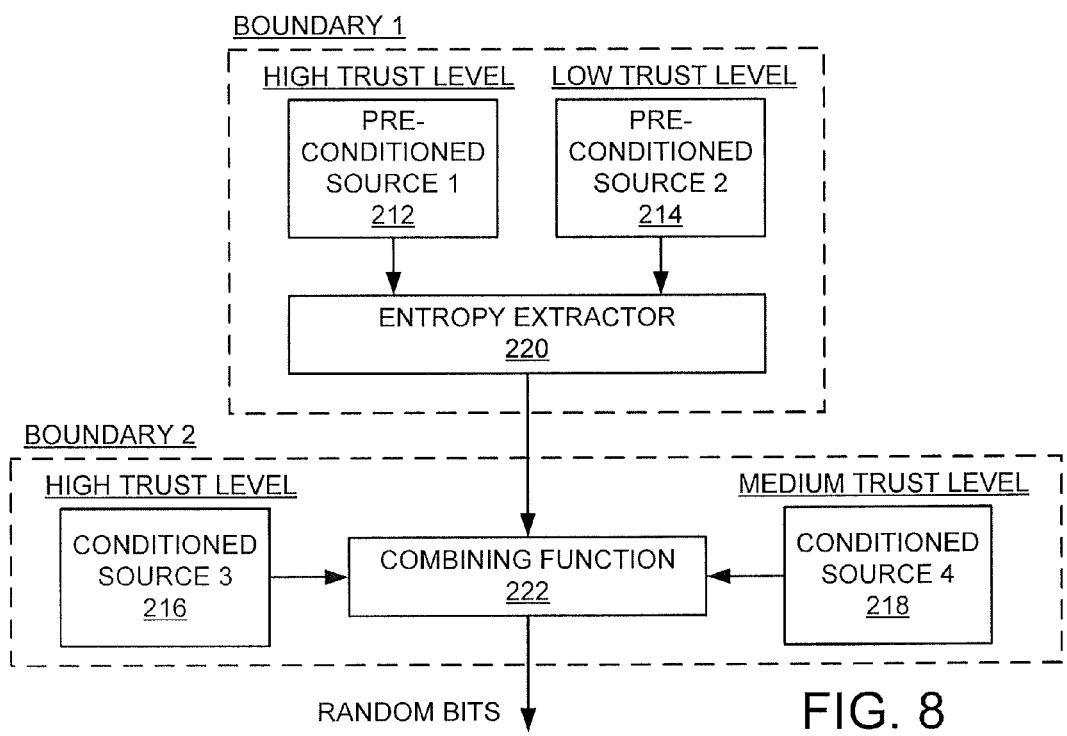
FIG. 8 illustrates the generation of random numbers from multiple entropy sources having different trust levels in accordance with other embodiments.

FIG. 8 provides another alternative arrangement for the generation of random numbers. FIG. 8 provides first, second, third and fourth entropy sources 212, 214, 216 and 218, respective denoted as sources 1 through 4. The first and second entropy sources 212, 214 are pre-conditioned entropy sources, and the third and fourth entropy sources 216, 218 are conditioned entropy sources. An extractor 220 combines the inputs from the sources 212, 214 to provide a conditioned input to a combining function module 222, which also receives the respective conditioned outputs from the sources 216, 218. As before, the combining function can take a variety of forms to output the random bit sequence. FIG. 8 thus combines aspects of the approaches set forth by FIGS. 6 and 7.

Numerous variations can be implemented based on the foregoing discussion as desired. Aspects of FIGS. 6-8 can be combined and additional processing blocks can be employed such as hash blocks or encryption blocks, additional stages of DRBGs, etc. Regardless of form, entropy values from multiple entropy sources are combined to generate the final random numbers in relation to the associated trust levels of the sources.

Figure 9:
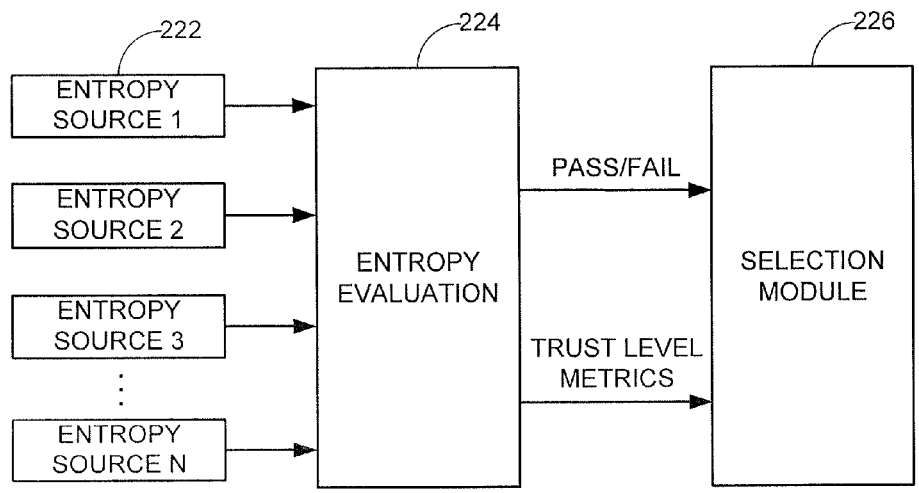
FIG. 9 illustrates operation of an entropy evaluation module and a selection module of the entropy manager of FIG. 3.

FIG. 9 provides a top level view of additional aspects of the entropy manager circuitry of FIG. 3 in accordance with some embodiments. A total of N entropy sources 222 are provided as described above. The N sources 222 take a variety of constructions and forms, may be conditioned or pre-conditioned, provide different levels of entropy, are physically proximate or placed across one or more cryptographic boundaries, may be certified and/or hardened, and each will have an associated trust level.

The outputs from each of the sources are functionally provided to an entropy evaluation module 224. Generally, the entropy evaluation module 224 monitors the various entropy sources 222 during operation to evaluate the respective entropy characteristics of the sources. A number of statistical tests can be applied by the entropy evaluation module the entropy values. Suitable test protocols are discussed including in NIST document 800-90B. Values from the various entropy sources can be accessed from entropy pools that hold accumulated entropy values in local memory.

Depending on the results of the evaluation, a pass/fail indication may be generated for each source, indicating whether the source is qualified for continued use (pass) or should be temporarily disqualified and not used (fail). Depending on the construction and operation of the various entropy sources, it is contemplated that at least some of the sources may be disqualified and unavailable for use at various times, and then may be later reinstated as qualified sources at other times.

The entropy evaluation module 224 further provides trust level metrics for the respective sources 222. The trust level metrics can take a variety of forms including a numeric score value or a relative grade level. The numeric score value may be expressed as a number within a predefined range, such as from 0 to 1, with higher (or lower) values indicating a higher level of trust. The relative grade levels may be relative sorting values, such as low, medium or high. Other forms of trust level metrics can be formulated and used.

The trust level metrics can allow the sorting of the available qualified entropy sources into a hierarchy from the highest trusted source(s) to the lowest trusted source(s). Depending upon the availability, this hierarchy may change over time.

A selection module 226 selects among the available and qualified entropy sources and combines these in relation to the trust level metrics to adaptively generate the random numbers. In some cases, the module 226 will identify all of the entropy sources available within the system at a given time and will select among those having the highest trust level(s).

A variety of selection strategies can be used. One scheme may have a total of M available entropy sources and the random numbers are generated using at least N sources (where N<M), so long as at least P of the N sources (where P<N) have at least a specified level of trust (e.g., medium, high). Another scheme may require the presence of at least X sources at high trust levels in order to proceed with the generation of the random numbers.

Still another scheme may require at least one local source with a high trust level and at least one other distal source with a specified trust level (such as a high trust level) in order to proceed. It will be recognized that presenting entropy from a variety of different locations (e.g., adjacent storage devices; the control boards in a JBOD enclosure; a host device) and selecting a subset of these, including different combinations at different times, can further serve to frustrate an attacker since it is not necessarily clear which sources are being used at a given time.

Figure 10:
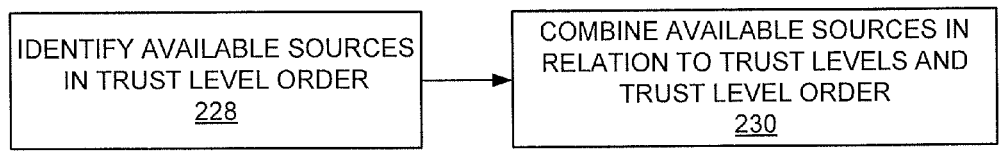
FIG. 10 is a simplified sequence flow depicting operation of the selection module of FIG. 9.

In sum, the selection module 226 uses the pass/fail qualification status and the associated trust level metrics to select which entropy sources are used as well as the relative contributions from each. As shown by processing block 228 in FIG. 10, the selection module 226 generally operates to first identify all of the available qualified sources and list these in trust level order (e.g., from highest trust level to lowest trust level). The selection module 226 then combines the entropy from the available sources in relation to the trust levels and in accordance with the trust level order at block 230.

Figure 11:
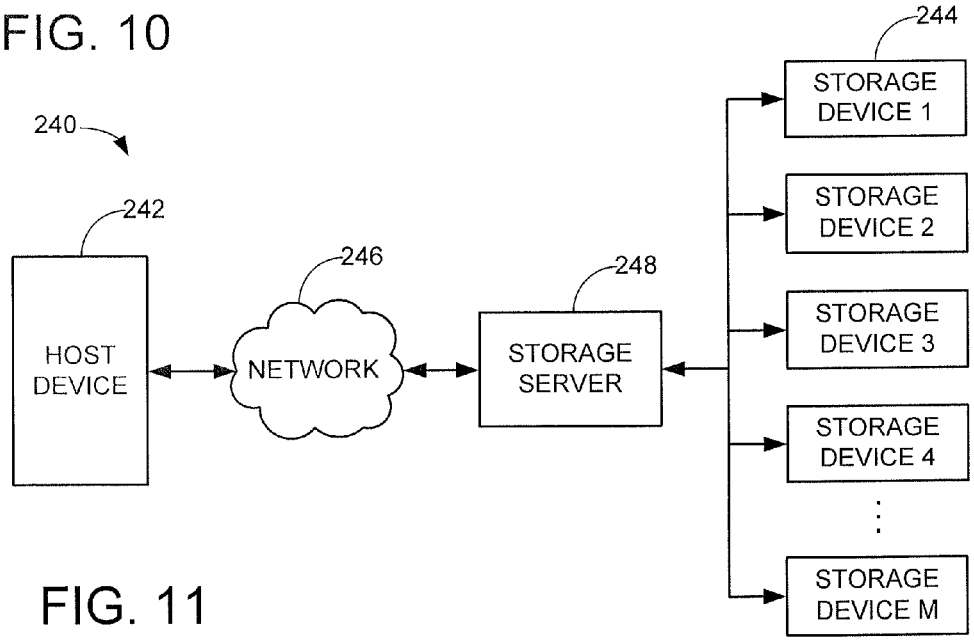
FIG. 11 is a functional block representation of a distributed data processing system that can utilize entropy values from multiple geographically distributed sources.

FIG. 11 shows another data processing system 240 in accordance with some embodiments. The data processing system 240 includes a host device 242 and a plural number M storage devices 244 similar to the devices 102, 104 discussed above in FIG. 1. These respective devices communicate via a communication network 246 and a storage server 248. Without limitation, in one embodiment the storage devices 244 are enclosed in a JBOD (just a box of drives) type storage enclosure in a distributed object storage system (e.g., cloud computing environment), the host device 242 is a computing device used by a remote user of the storage system, the network 246 constitutes the Internet or other network(s), and the storage server 248 is a proxy server with which the host device 242 communicates to transfer data between the host device and the storage devices. Other configurations can be used.

A data security scheme is implemented in the system 240 that utilizes random numbers as inputs to various cryptographic functions to protect data stored on the storage devices 244. Entropy sources can be identified, evaluated and used from the respective host device 242, storage devices 244 and/or server 246 as desired in a manner discussed above.

Figure 12:
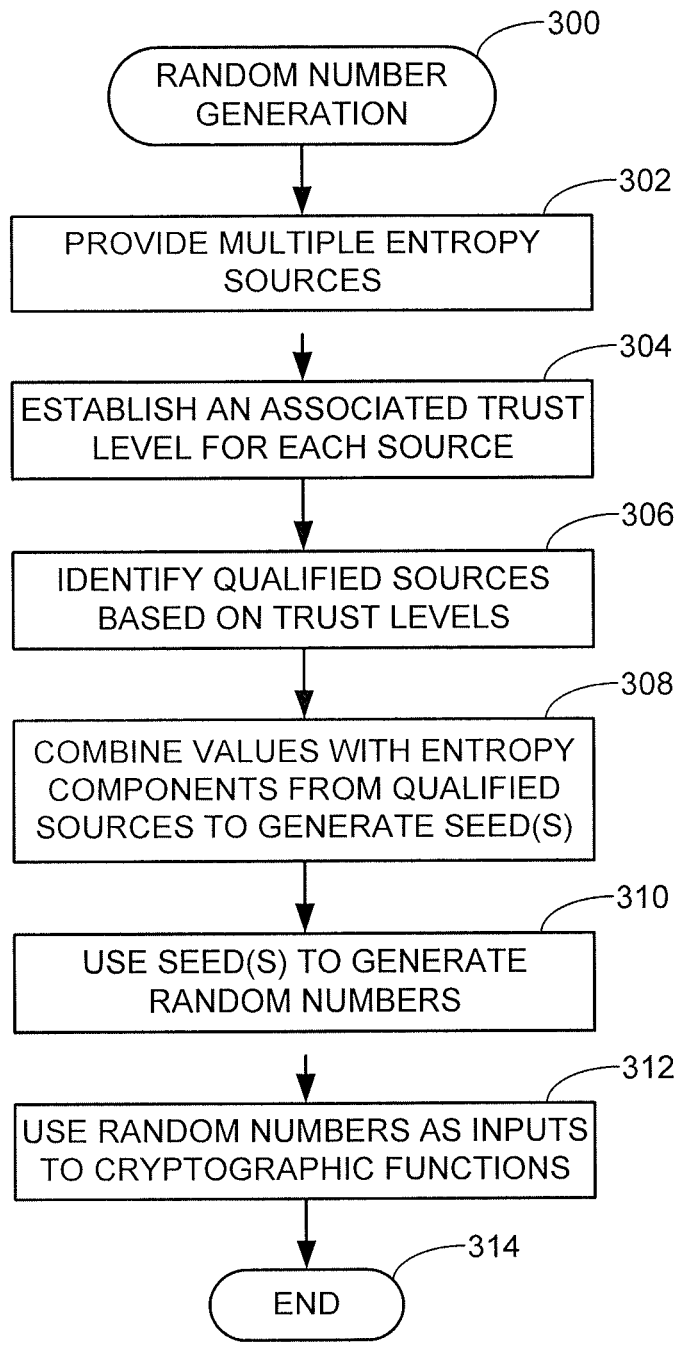
FIG. 12 is a random number generation routine illustrative of steps that may be carried out in accordance with some embodiments of the present disclosure.

FIG. 12 is a random number generation routine 300 illustrative of steps carried out in accordance with the foregoing discussion. The various steps can be modified, omitted, carried out in a different order, and additional steps can be added. For purposes of discussion, it will be contemplated that the routine 300 is carried out using the system 100 of FIG. 1 using an entropy manager 130 as set forth in FIG. 3 located in the data storage device 104. Other applications of the routine can be used as desired.

The routine begins with the identification and provision of multiple entropy sources at step 302. The various entropy sources each generate entropy values with various levels of entropy. Example forms of entropy sources are discussed above with respect to FIG. 2, and other forms can be used. It is contemplated that the system incorporates separate physical devices (e.g., a host device, at least one storage device, etc.) and at least one of the multiple entropy sources is located in each of these separate physical devices.

An associated trust level is established for each of the entropy sources at step 304, and qualified entropy sources are identified using the established trust levels in step 306. These evaluations can be carried out as discussed above in FIG. 8. In some cases, the trust level will be a pass/fail indication that the entropy source is sufficiently well-behaved as to constitute a qualified entropy source. In other cases, the trust level will be in the form of trust level metrics that provide a measure of trustworthiness relative to others among the various entropy sources or based on a variety of factors including whether cryptographic boundaries are crossed. In further cases, the qualified entropy sources are sorted into a hierarchy from most trusted to least trusted qualified source.

Entropy values from at least some of the qualified entropy sources are combined at step 308 to generate input (seed) values. The entropy values can be combined in a variety of ways including as set forth above in FIGS. 6-8. The seed values are used as inputs to random number generator circuits to generate a sequence of random numbers, step 310. As discussed above, the random number generator circuits may take the form of a DRNG, although such is merely exemplary and not limiting.

The generated random numbers are thereafter used at step 312 as inputs to one or more cryptographic functions in a data security scheme. The random numbers can be used as cryptographic keys, tweaks, seed values, selection values, etc. The cryptographic functions can take any of a variety of forms including encryption algorithms, hash functions, keyed message digest (e.g., HMAC) generators, etc. The routine then ends at step 314.

By combining entropy values from multiple sources located in separate physical devices, better randomness is assured as factors that would tend to reduce entropy will have a smaller effect on the individual entropy sources. Qualification of the entropy sources further ensures randomness in that those sources not exhibiting operation at a sufficient trust level are temporarily omitted from the process. Evaluating and combining multiple entropy sources in relation to the determined trust levels thus helps to assure improved data security.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A computer implemented method comprising:
   deriving a first multi-bit string of entropy values from a first entropy source having a first trust level and a different, second multi-bit string of entropy values from a second entropy source having a different, second trust level;
   combining the first and second multi-bit strings of entropy values in relation to the associated first and second trust levels to generate a multi-bit random number; and
   using the multi-bit random number as an input to a cryptographic function.

2. The method of claim 1, wherein the first entropy source is located within a data storage device and the second entropy source is located in a host device coupled to the data storage device, the data storage device comprising a non-volatile memory which stores user data supplied by the host device.

3. The method of claim 2, wherein the cryptographic function is used to encrypt the user data stored on the non-volatile memory and supplied by the host device.

4. The method of claim 1, wherein the first entropy source provides entropy values having a low entropy component, and the method further comprises applying an extraction process to the entropy values from the first entropy source.

5. The method of claim 1, wherein the combining step comprises applying a selected hash function to the first and second multi-bit strings of entropy values.

6. The method of claim 1, wherein the combining step further comprises applying the first and second multi-bit strings of entropy values to a deterministic random number generator (DRNG) which generates the random number therefrom.

7. The method of claim 1, wherein the combining step comprises applying a selected combinatorial function to the first and second multi-bit strings of entropy values to generate a combined output value.

8. The method of claim 1, wherein the first and second trust levels are assigned in relation to one or more cryptographic boundaries.

9. The method of claim 1, the first trust level characterized as a high trust level responsive to the first entropy source being disposed within a first cryptographic boundary, the second trust level characterized as a lower trust level responsive to the second entropy source being disposed outside the first cryptographic boundary and inside a second cryptographic boundary that also encloses the first cryptographic boundary.

10. The method of claim 1, wherein the first entropy source is a host operating system (OS) level entropy source from a host device, the second entropy source is a data storage device level entropy source from a data storage device, and the cryptographic function is an encryption operation that encrypts data supplied by the host device and stored in a non-volatile memory of the data storage device, the first trust level being lower than the second trust level.

11. The method of claim 1, further comprising generating a first trust level metric for the first entropy source and a second trust level metric for the second entropy source, wherein the combining step comprises generating a first weight value for the first multi-bit entropy value responsive to the first trust level metric and a second weight value for the second multi-bit entropy value responsive to the second trust level metric, and generating the random number responsive to the first and second weight values.

12. An apparatus comprising:
    a first entropy source which generates a first sequence of entropy values;
    a second entropy source which generates a second sequence of entropy values;
    a trust level evaluation circuit which assigns a first trust level for the first entropy source responsive to the location of the first entropy source within a first cryptographic boundary and a second trust level for the second entropy source responsive to the location of the second entropy source outside the first cryptographic boundary;
    a random number generator circuit which generates a random number responsive to the first and second sequences of entropy values and the associated first and second trust levels; and
    a cryptographic function block which applies a selected cryptographic function to a set of input data responsive to the random number from the random number generator circuit.

13. The apparatus of claim 12, wherein the first entropy source is located within a data storage device, the first cryptographic boundary is a hardware sub-boundary within the data storage device, the second entropy source is located within a host device coupled to the data storage device, the data storage device comprising a non-volatile memory used to store user data from the host device.

14. The apparatus of claim 13, wherein the cryptographic function comprises an encryption algorithm used to encrypt user data stored on the data storage device from the host device, wherein the random number is used to form a key used by the encryption algorithm.

15. The apparatus of claim 12, wherein the first entropy source provides entropy values having a low entropy component, and the apparatus further comprises an extractor which applies an extraction process to the entropy values to generate the first sequence of entropy values.

16. The apparatus of claim 12, further comprising a deterministic random number generator (DRNG) which generates the random number from the first and second entropy values.

17. The apparatus of claim 12, further comprising a combinatorial function block and a deterministic random number generator (DRNG), the combinatorial function block applying a selected combinatorial function to the first and second sequences of entropy values to generate a combined output value which is used as a seed value as an input to establish an internal state of the DRNG which generates the random number therefrom.

18. The apparatus of claim 12, further comprising an entropy evaluation block which identifies a population of available entropy sources and associated trust levels, and a selection block which combines entropy from a subset of the available entropy sources in relation to the associated trust levels.

19. A data storage device comprising:
a non-volatile memory; and
a controller adapted to direct data transfers between the non-volatile memory and a host device, the controller generating a random number for use in a cryptographic function applied to a selected set of data stored in the non-volatile memory by establishing a first trust level for a first entropy source and a second trust level for a second entropy source, combining entropy values from the respective first and second entropy sources responsive to the first and second trust levels to generate an output value, and using the output value to generate the random number.

20. The apparatus of claim 19, wherein the first entropy source is disposed within the data storage device and the second entropy source is disposed within the host device.

* * * * *